(12) United States Patent
Hall et al.

(10) Patent No.: US 10,447,037 B2
(45) Date of Patent: Oct. 15, 2019

(54) PORTABLE TRANSFER SWITCH

(71) Applicants: David R. Hall, Provo, UT (US); Seth Myer, Eagle Mtn., UT (US)

(72) Inventors: David R. Hall, Provo, UT (US); Seth Myer, Eagle Mtn., UT (US)

(73) Assignee: Hall Labs LLC, Provo, UT (US)

( * ) Notice: Subject to any disclaimer, the term of this patent is extended or adjusted under 35 U.S.C. 154(b) by 287 days.

(21) Appl. No.: 15/465,870

(22) Filed: Mar. 22, 2017

(65) Prior Publication Data
US 2018/0278086 A1    Sep. 27, 2018

(51) Int. Cl.
| H02J 3/00 | (2006.01) |
| H02J 9/00 | (2006.01) |
| H01R 25/00 | (2006.01) |
| H02J 9/06 | (2006.01) |
| H01R 13/703 | (2006.01) |
| H02J 9/04 | (2006.01) |

(52) U.S. Cl.
CPC ............ *H02J 3/005* (2013.01); *H01R 13/703* (2013.01); *H01R 25/003* (2013.01); *H02J 3/006* (2013.01); *H02J 9/00* (2013.01); *H02J 9/04* (2013.01); *H02J 9/06* (2013.01)

(58) Field of Classification Search
CPC ..... H01R 25/003; H01R 13/703; H02J 3/005; H02J 9/00; H02J 9/04; H02J 9/06; H05J 3/006
USPC .......................................... 307/29
See application file for complete search history.

(56) References Cited

U.S. PATENT DOCUMENTS

| 2010/0141040 | A1* | 6/2010 | Chapel | ............... | H01R 13/6683 307/80 |
| 2013/0193757 | A1* | 8/2013 | Batzler | .................... | H02J 3/14 307/41 |

* cited by examiner

*Primary Examiner* — Carlos Amaya

(57) ABSTRACT

A portable transfer switch assembly for selecting power from a plurality of sources to supply to a load. The assembly contains a controller comprising logic that is defined by a user. The user defined switch controller allows an optimal power source to supply power to selected loads based on user input, sensors and pre-defined data. The assembly further provides load shedding of loads connected via one or more receptacles based on user input, sensors and pre-defined data.

20 Claims, 19 Drawing Sheets

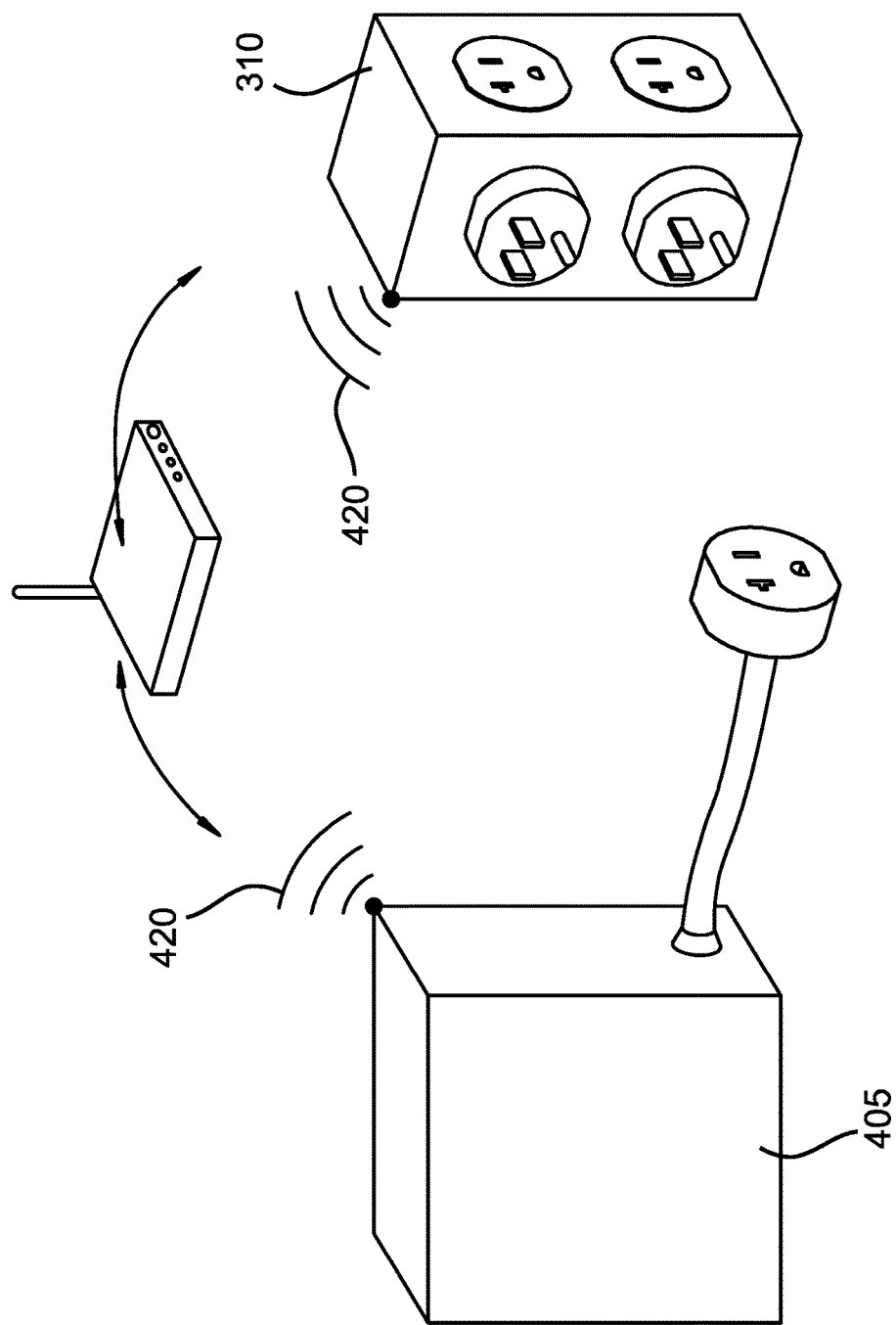

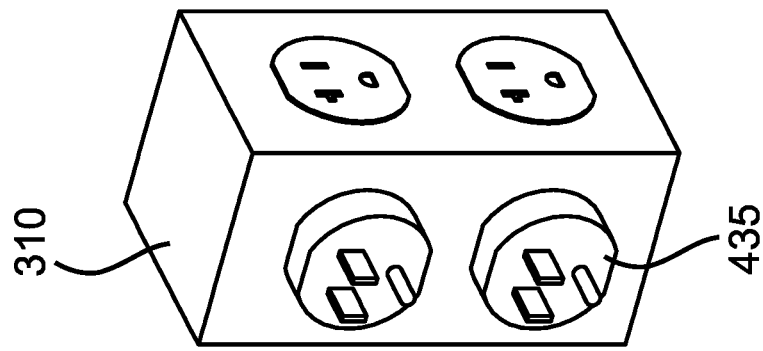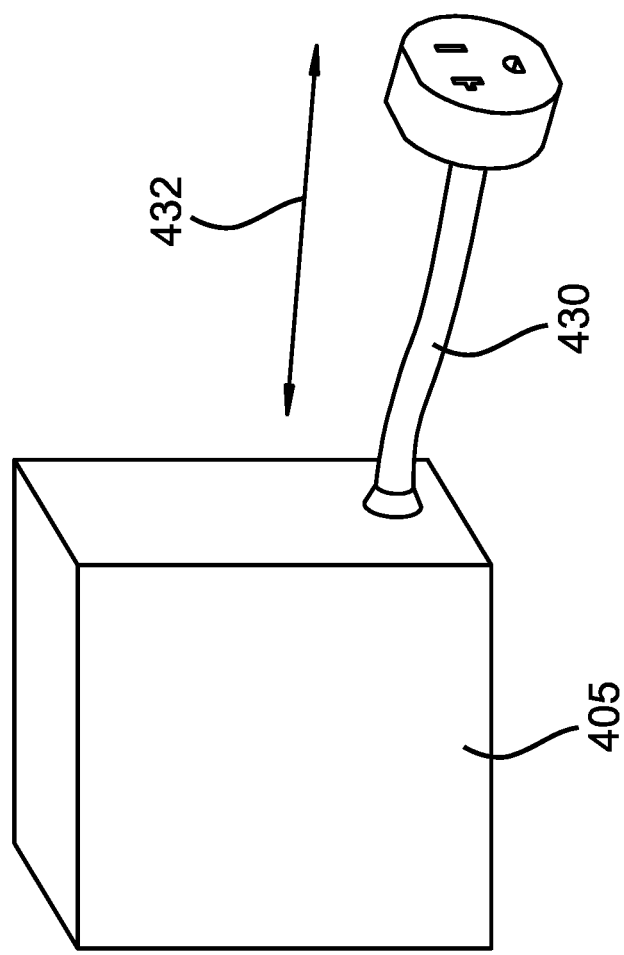
FIG. 4D

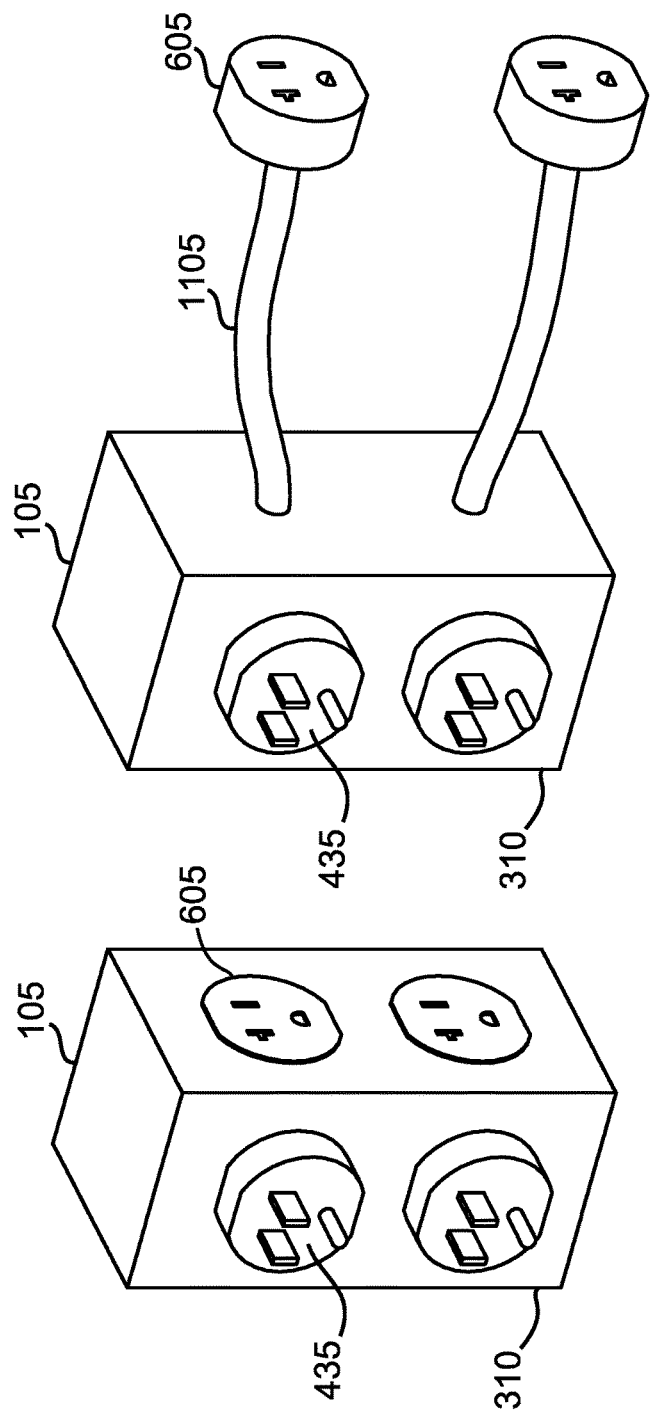

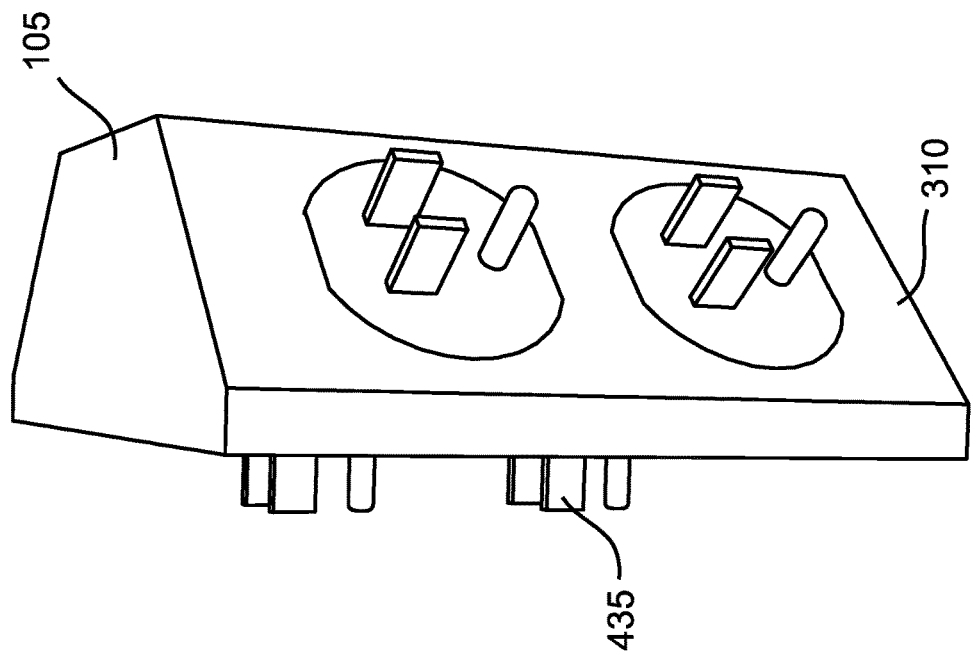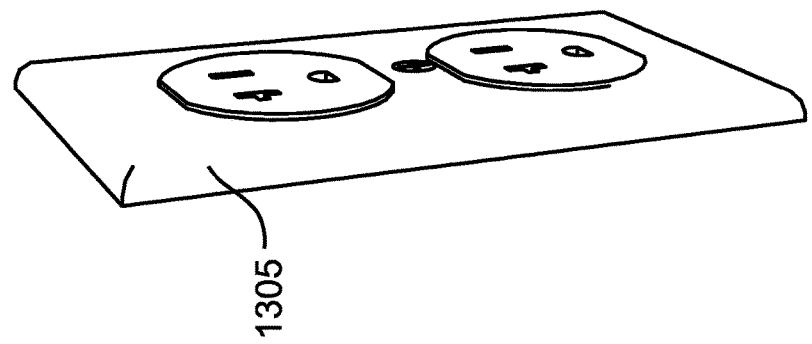
FIG. 13B

PORTABLE TRANSFER SWITCH

BACKGROUND

Field of the Invention

This invention generally relates to power source switching to electrical loads, specifically portable transfer switches that select which power source to feed the electrical loads.

Background of the Invention

Automatic transfer switches exist to supply multiple power sources to a load. These devices ensure a supply of power should one of the power sources become unavailable.

The advantages of these types of systems are known but there are some disadvantages. Transfer switches are permanent fixtures where they are installed and establish permanent electrical connections to the power sources and to the loads.

Another disadvantage is that in many cases these transfer switches operate in the absence of logic, in an automatic manner. They will switch to a secondary power source based on the single condition that a primary power source becomes unavailable.

Furthermore, the operation of these automatic transfer switches doesn't account for equally viable power being available from more than two power sources. This means there will be no possibility to optimize many consumer based considerations including cost of power, and consumption of power from desired power sources. For example, if a user wants to have their electrical loads served by renewable energy as a primary source and only switch over to utility power when the solar power source is not available in order to save money on their power bill, a transfer switch that facilitates this option would be desirable.

In many cases, transfer switches select utility power as a main or primary source and only switch to generators or alternate power sources when utility power is interrupted. It is therefore desirable to have a way to power electrical loads from alternative sources such as solar, fuel cells or generators as a primary source, with the utility as secondary.

SUMMARY

This invention has been developed in response to the present state of the art and, in particular, in response to the problems and needs in the art that have not yet been fully solved by currently available systems and methods. Features and advantages of different embodiments of the invention will become more fully apparent from the following description and appended claims, or may be learned by practice of the invention as set forth hereinafter.

Consistent with the foregoing, a multiple power source selectable transfer switch is disclosed wherein logic is utilized to optimally select between multiple power sources for supplying power to a load, given varying situations and conditions.

Furthermore, the transfer switch is designed to be portable. It is interfaceable with multiple different types of power sources and multiple loads by means of removable plugs and receptacles. Utilizing a pluggable interface allows the transfer switch to be repeatedly connected and disconnected with all power sources and loads very quickly and simply.

In one embodiment, the transfer switch directs power from one power source to another power source. Any of the power sources may need to function as first loads, drawing power from the other power sources. For example, batteries may need to supply power to the transfer switch as well as draw power from other power sources in order to be charged.

In an embodiment, the electrical transfer switch assembly includes a portable switch body. The portable switch body includes at least two or more switches; two or more plug connectors electrically connected to one or more of the two or more switches and connected to one or more power sources or one or more first loads; one or more receptacle connectors electrically connected to one or more of the two or more switches and connected to one or more second loads; and a user defined switch controller that selectively connects the plugs and receptacles with the one or more power sources and with the one or more first and second loads.

In another embodiment, a controller performs functions based on decisions made by the logic. The functions performed by the user defined switch controller include changing the selective connection of the switches, controlling operations of the power sources, sending information to remote locations, and load shedding. The logic makes decisions based on operational variables, sensor data of the power sources, as well as user input.

In certain embodiments, the operation variables include cost of power, time, history of power consumption, rate of power consumption, load requirements, weather conditions, selective connections of the user defined switch controller.

In an embodiment, the sensor data include AC and DC voltage levels and fluctuations, AC and DC current levels and fluctuations, frequency variations, interruptions in power, fuel level, battery voltage, temperature.

In one embodiment, the user input includes executable instructions such as control of selective connections, control of operations of the power sources, and control of load shedding.

In another embodiment, the logic of the user defined switch controller can be reprogrammed by the user to change its settings to optimize the needs of the individual user.

In an embodiment, the user input is sent to the logic from either remote or local locations. In one embodiment, remote locations include a computer, a phone, a network, the cloud, a server, or some other wireless device. In one embodiment, local locations include buttons, switches, a display or a touch screen display.

In one embodiment, the user defined switch controller sends information to the remote locations. The information includes operation variables and sensor data.

In certain embodiments, the transfer switch communicates with the remote locations by communication means including power line communication (PLC), an Ethernet cable, WiFi, satellite, cell phone tower, Bluetooth, high bandwidth or low bandwidth wireless.

In an embodiment, the logic receives sensor data and sends operational commands to the power sources by the communication means. In one embodiment, the operational commands sent to the power sources include turning the power sources on or off, as well as turning on or off any heating or cooling systems of the power sources.

In one embodiment, the transfer switch can selectively connect power sources including the utility grid, a diesel generator, fuel cells or batteries as well as any kind of renewable energy source including solar power, wind power or hydroelectric power.

In certain embodiments, the user defined switch controller monitors sensor data and operation variables in such a manner that current states of the sensor data and operation variables will be continually updated while also being stored over a period of time as historical states. In one embodiment, the logic makes predictions regarding future states of the of the sensor data and operation variables. The predicted future states being used by the logic for determining functions of the user defined switch controller.

In an embodiment, the invention includes functionality for load shedding. The user defined switch controller selectively disconnects certain loads as dictated by the logic of the user defined switch controller and as power becomes insufficient to meet all load demands.

In another embodiment, the loads are divided into groups including normal, emergency and critical. In one embodiment, these groups are arranged spatially in their attachment to the portable switch body. In one embodiment, there is an indication as to which loads, or which groups of loads, have power being supplied to them. This indication may include any auditory or visual signal including LED indicators.

In an embodiment, the transfer switch connects to AC and DC power sources.

In one embodiment, the transfer switch is interfaceable with power sources and loads by numerous different standards of power plug connectors including NEMA, ANSI, IEEE, IPC, USB, ISO, IEC or other electrical standard. In one embodiment, the invention includes plug connectors and receptacle connectors that are either male or female.

In an embodiment, the plug connectors and receptacle connectors are attached directly to the portable switch body. In one embodiment, the plug connectors and receptacle connectors are attached to the portable switch body by means of an electrical cord or electrical cable.

In another embodiment, the invention includes an indication as to which power source is supplying power. The indication includes any auditory or visual signal including LED indicators on the portable switch body.

In an embodiment, the portable switch body mounts inside of a standard electrical box in a manner similar to a standard wall receptacle. The portable switch body is interfaceable with a standard outlet cover plate.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 4A, 4B, 4C, and 4D show the various means by which the user defined switch controller of the transfer switch assembly may communicate with the power sources in sending operational commands and receiving sensor data, according to certain embodiments.

FIGS. 12A and 12B show isometric views of the transfer switch assembly with receptacle connectors that are attached to the portable switch body either directly or via and electrical cord, according to example embodiments.

FIG. 13B is an isometric view of an embodiment of the transfer switch assembly wherein the entire portable switch body can be plugged and unplugged with a standard wall outlet, according to one example embodiment.

DETAILED DESCRIPTION OF THE DRAWINGS

Figure 1A:
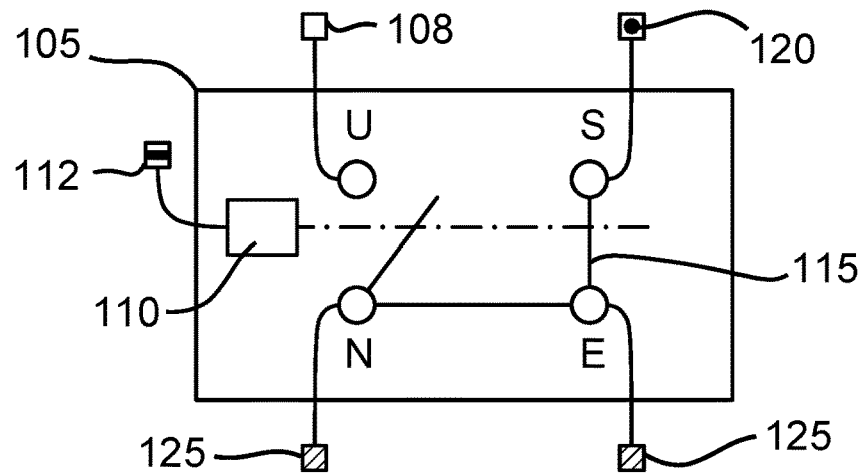
FIGS. 1A, 1B and 1C show the user defined switch controller and possible configurations of the switches demonstrating that power sources can alternately functions as first loads, according to certain example embodiments.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments, a portable transfer switch assembly as described herein enables a user to plug in a transfer switch in any desired location. This portable transfer switch further provides load shedding capabilities for loads served via the switch. In various embodiments, the assembly includes wireless control of multiple power sources and loads to be connected via multiple switches inside a main switch body.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence.

For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium, also referred to as memory, that stores data or program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device. Computer readable storage medium excludes computer readable signal medium and signals per se.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1B:
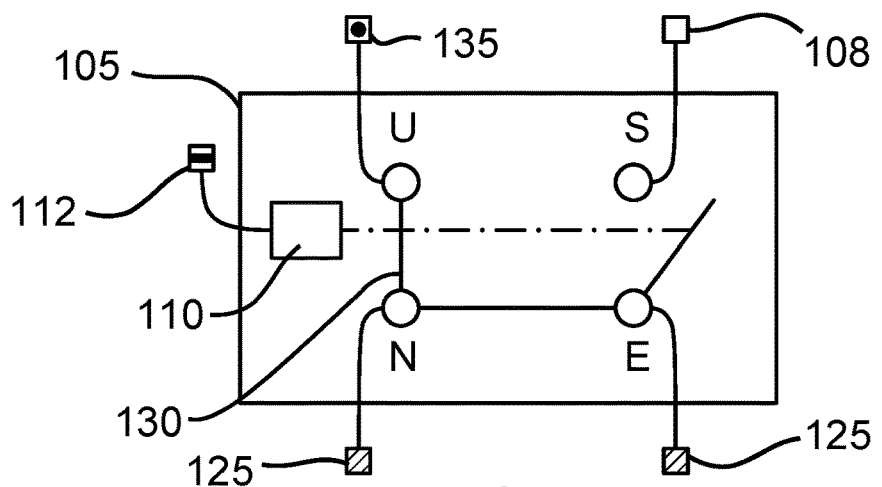
Figure 1C:
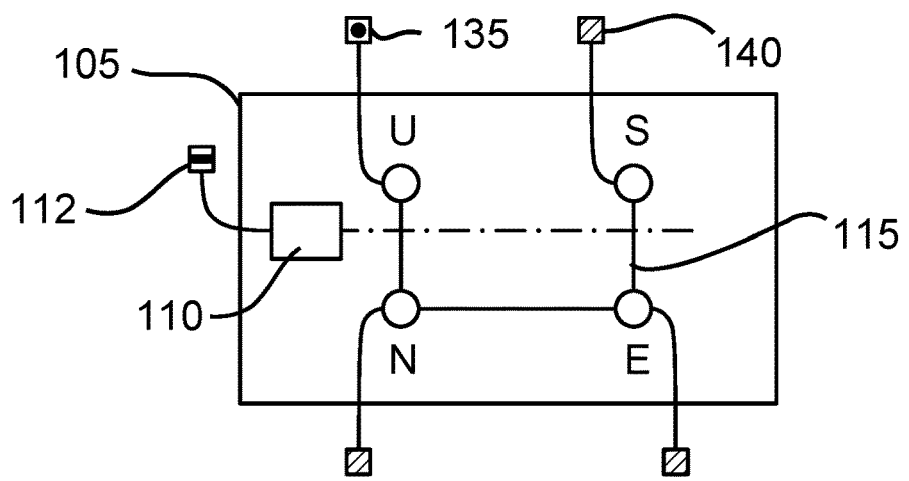

FIGS. 1A, 1B and 1C are views of the user defined switch controller 110 inside a portable switch body 105, and possible configurations of the switches demonstrating that power sources can alternately function as first loads. FIG. 1A shows that the user defined switch controller 110 has selectively connected one of the switches 115 to a primary power source 120, for example a solar power source. Power is being supplied to one or more second loads 125. FIG. 1B is a configuration of the switches wherein the user defined switch controller 110 has selectively connected a switch 130 to a secondary power source 135, for example the utility grid, in order to supply power to one or more second loads 125, while selectively disconnecting the primary power source 120. FIG. 1C shows that the user defined switch controller 110 has selectively connected a switch 115 to the primary power source 120 depicted in FIG. 1A, which now draws power from the secondary power source 135, thus making it function as a first load 140.

In an embodiment, the electrical transfer switch assembly is connected to a renewable energy source such as wind or solar. This renewable source is the main or primary power source. The transfer switch is also connected to utility power as a secondary source. In this embodiment, the user may elect to use solar for the bulk of the primary electricity used by the connected loads. In this configuration, the transfer switch will remain in the solar switch position until a pre-defined (by the user) event happens. In a certain embodiment, the solar may further charge batteries. In normal operation, the solar may be providing enough energy for the electrical loads connected via the transfer switch. However, at night the solar charged batteries may drop below a pre-determined voltage level. When the batteries drop below a pre-determined low voltage level, sensors may inform the controller, and in this case, the user defined logic may determine that the solar/battery system can no longer support the loads. At this time, the controller operates the appropriate switches to first 1) disconnect the solar/battery source as the primary power source, then 2) connect the utility power as the primary source. After the loads are taken care of, there is the option of making a third connection. 3) The solar/battery module can be connected as a load to allow a battery charger at the solar/battery module to charge the batteries until they are at an acceptable charge level. Finally, once the batteries are fully charged, the controller may switch the source back from the utility source back over to the primary solar/battery source. In this way, the majority of the power is normally supplied by the solar/battery module, saving costs associated with paying power user fees to the utility company.

In other embodiments, the electrical transfer switch assembly switches more than two power sources. For example, it may be desirable to have a primary solar source and a secondary methane generator second source. In this case, the normal operation would power loads from a solar/battery module. When the solar/battery module source voltage level drops below a user defined level (due to an extended period of time of overcast weather, or at night), the controller would switch over power to the methane generator as the new primary source. Utility power would be the third and last choice in this embodiment. The methane generator is then able to charge the batteries as described in the previous example. In this embodiment, the utility power would only be selected as a source when both the solar/battery module and the methane generator are no longer able to continue supplying power to the loads.

Figure 2:
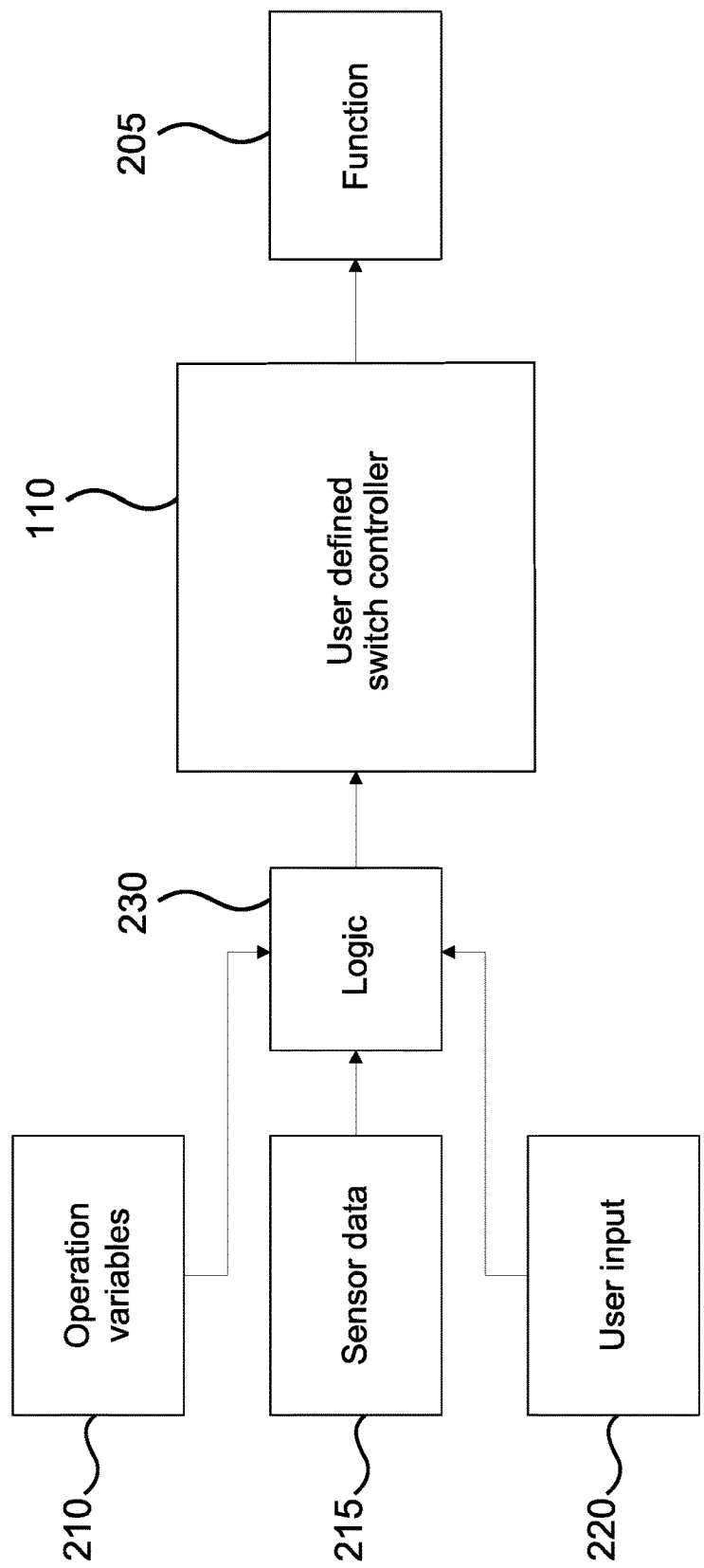
FIG. 2 is a flow diagram showing the inputs to the logic and that the logic affects the functions of the user defined switch controller, according to one example embodiment.

FIG. 2 is a flow diagram showing the process of deciding a function 205 of the user defined switch controller 110. The logic 230 receives operation variables 210, sensor data 215, and user input 220. The logic 230 determines and communicates a function 205 to be performed to the user defined switch controller 110. The logic 230 is stored in memory as part of the user defined switch controller 110 or external to the user defined switch controller 110. The user defined switch controller 110 performs a function 205 which could involve control of the selective connections, control of the power sources, control of load shedding, or communicating information to remote locations.

The logic may be stored in computer readable storage medium. Computer readable storage medium is also referred to as memory. The logic stored in memory may reside locally at the controller or at a remote location. All requisite data to operate the controller may be stored at either location (local memory or remote location memory). By mirroring all of the data, operation of the controller is assured even if any one source of data becomes corrupted or unavailable. For example, the local memory of an electrical transfer switch assembly may be damaged from a power surge or other event that prevents it from having the required logic to operate properly. In this case, the mirrored logic from any of the connected remote locations are able to still inform the controller as to how to operate. Likewise, if one of the remote locations become unavailable, an alternate source will still be able to inform the controller.

Figure 3:
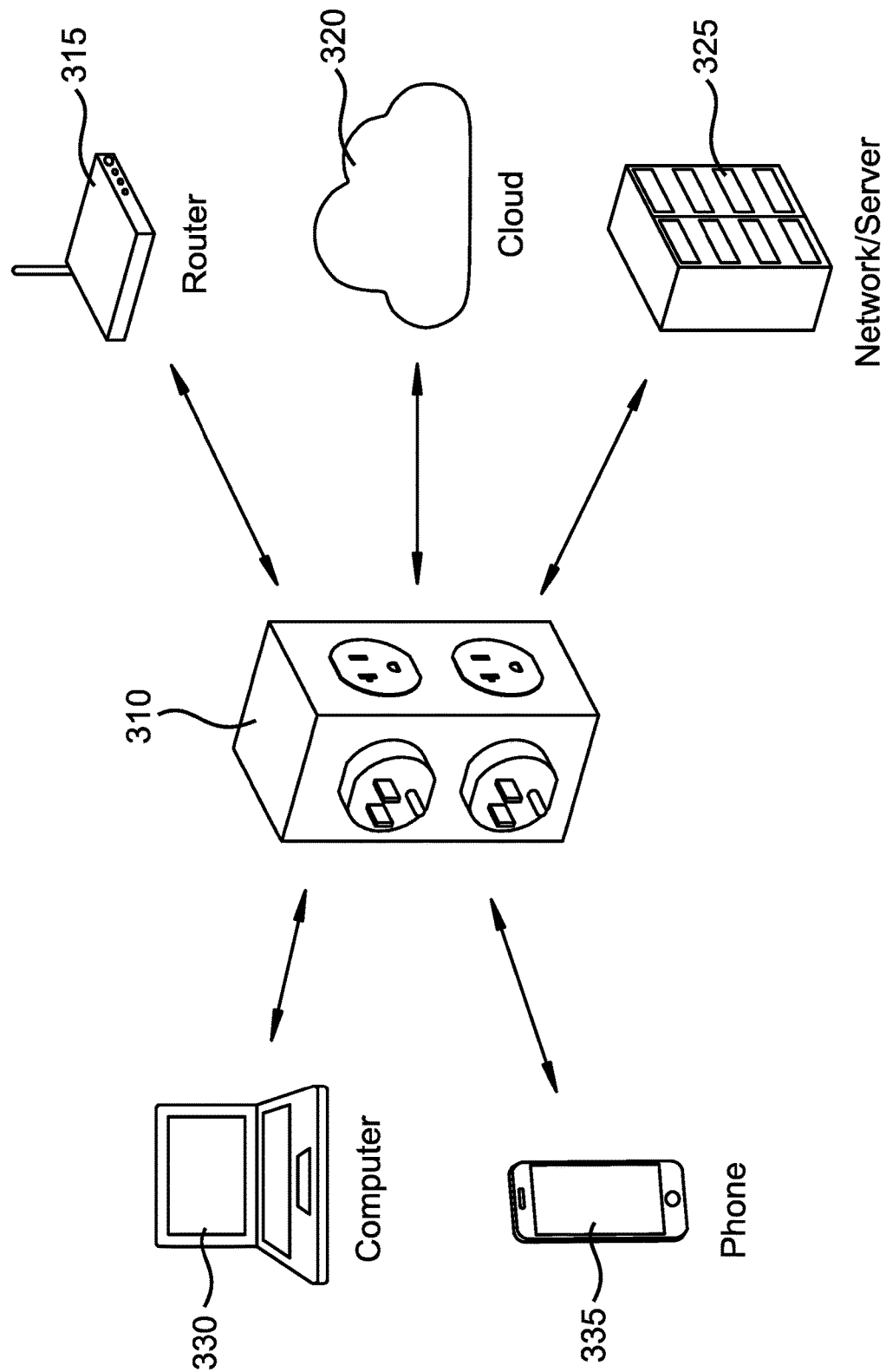
FIG. 3 is a diagram showing the possible remote locations with which the user defined switch controller may communicate, according to one example embodiment.

FIG. 3 is a diagram showing some of the possible remote locations with which the user defined switch controller of the transfer switch assembly 310 may communicate. The user defined switch controller of the transfer switch assembly 310 receives user input from the various remote locations. The user defined switch controller of the transfer switch assembly 310 sends information including sensor data and operation variables to the various remote locations. Remote locations comprise one or more of a router 315; a cloud network 320; a LAN or Wan network Server 325; a computer 330; and a phone 335. These remote locations may be configured to share data and control across all remote locations in order to maintain control settings and facilitate operation of the system. For example, if there is a memory failure at the user defined switch controller, control may still be carried out by the logic stored in memory of one or more of the remote locations. Likewise, if settings need to be changed at the user defined switch controller, it can be done from any of the remote locations. In another embodiment, the remote locations have all of the same capacities as the controller itself such as processors, logic, and memory which allows the remote location to carry out most of the control actions required to operate the switch. This provides for further redundancy of control functions assuring overall robustness of the system. In this embodiment, the controller itself may only need to have functional communication modules to send and receive commands along with ability to control the switches via relays or other switching methods. This bare bones local module is an operational part of the controller, and may be more robust in the event of a power surge or other event that may destroy some of the more sensitive electronic components. In this embodiment, the remote locations would carry the main responsibility for carrying out the commands for the control. This embodiment as described comprises a user defined switch controller that resides both locally (for some of the modules) and at remote locations (for other modules). The operational part is local and located within the portable switch body. The operational part activates the relays or other devices that actually physically switch the switches. This operational part is also able to communicate with the remote locations via either radio and antennas, or other communication devices (for example power line communication) to send and receive data informing the operation of the switches. This may be carried out by digital control methods or analog control. Some forms of control are less susceptible to damage and may be more robust. A simplified local design allows the multiple remote locations to have more responsibility.

Figure 4A:
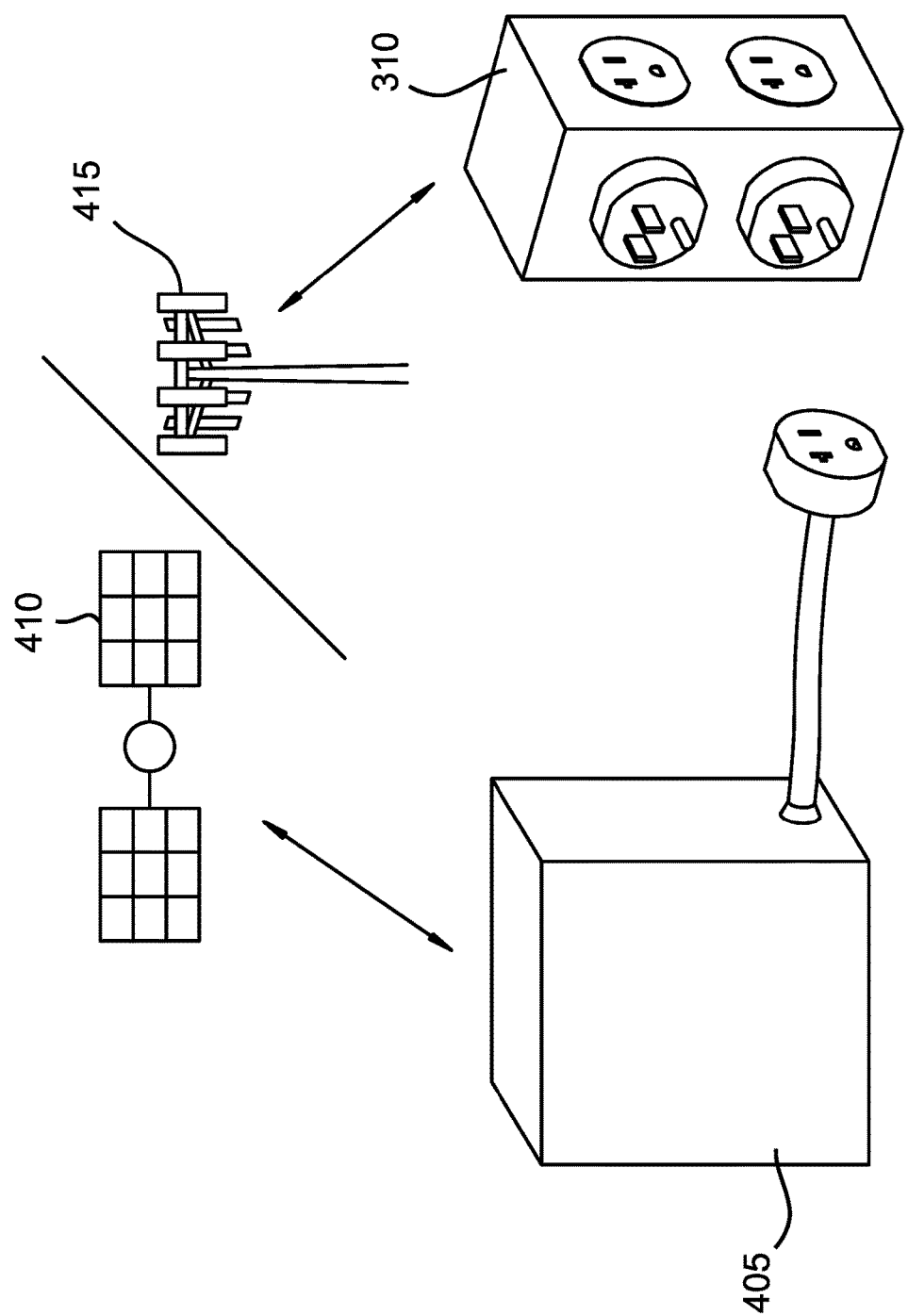

FIG. 4A shows a power source 405 in communication with the user defined switch controller of the transfer switch assembly 310 via satellite 410 or a cell phone tower 415. The user defined switch controller of the transfer switch assembly 310 may receive sensor data from a power source 405 as well as send operational commands to a power source 405 via satellite 410 or cell phone tower 415.

FIG. 4B shows a power source 405 in communication with the user defined switch controller of the transfer switch assembly 310 via WiFi 420. The user defined switch controller of the transfer switch assembly 310 may receive sensor data from a power source 405 as well as send operational commands to a power source 405 via WiFi 420.

Figure 4C:
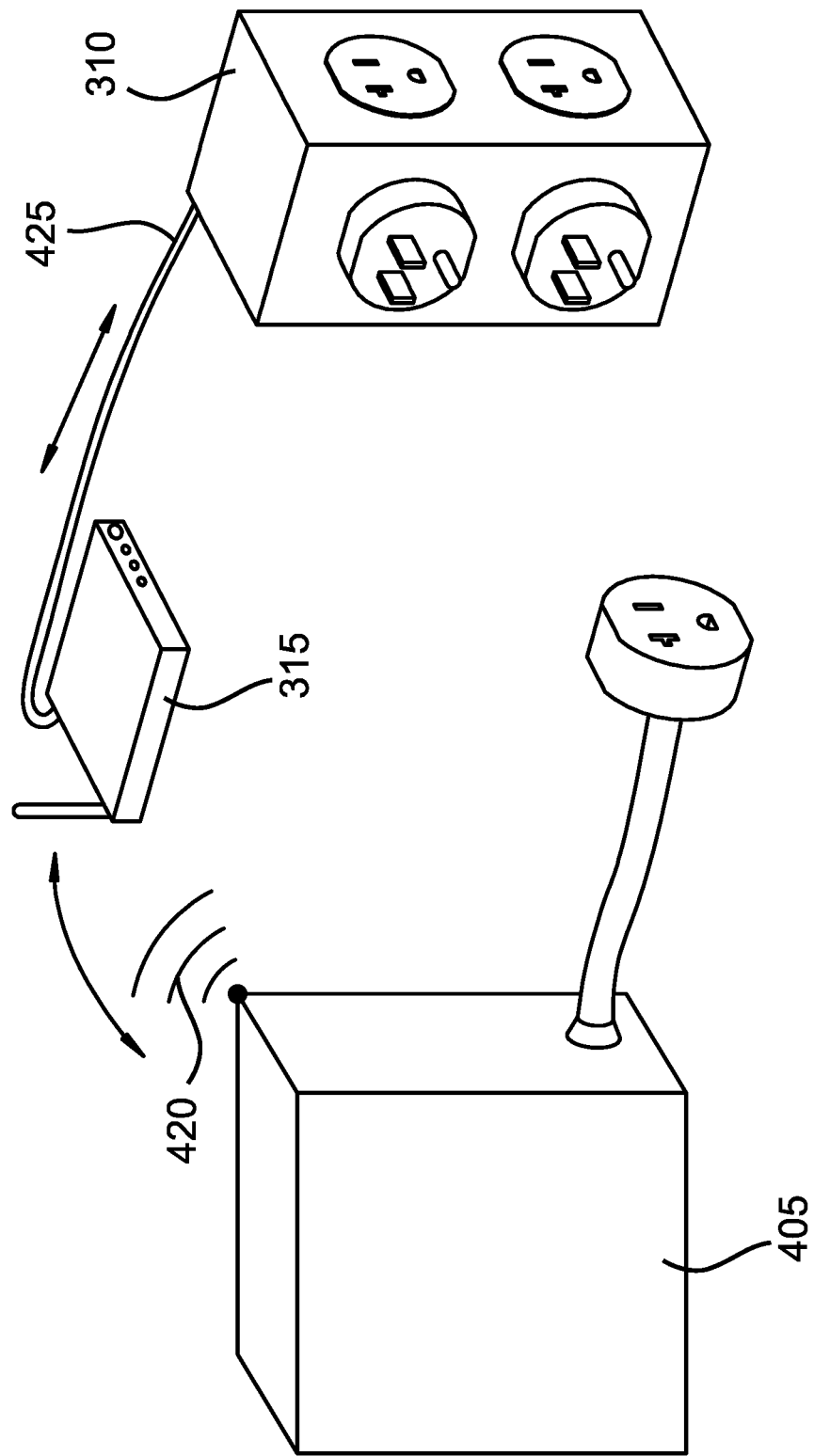

FIG. 4C shows a power source 405 in communication with the user defined switch controller of the transfer switch assembly 310 via an Ethernet cable 425. The user defined switch controller of the transfer switch assembly 310 may receive sensor data as well as send operational commands via an Ethernet cable 425.

FIG. 4D shows a power source 405 in communication with the user defined switch controller of the transfer switch assembly 310 via power line communication (PLC) 432. The PLC 432 is contained in the cord 430 used to connect the power source 405 to the plug connectors 435 of the transfer switch assembly 310. The user defined switch controller of the transfer switch assembly 310 may receive sensor data from a power source 405 as well as send operational commands to a power source 405 via PLC 432.

Figure 5A:
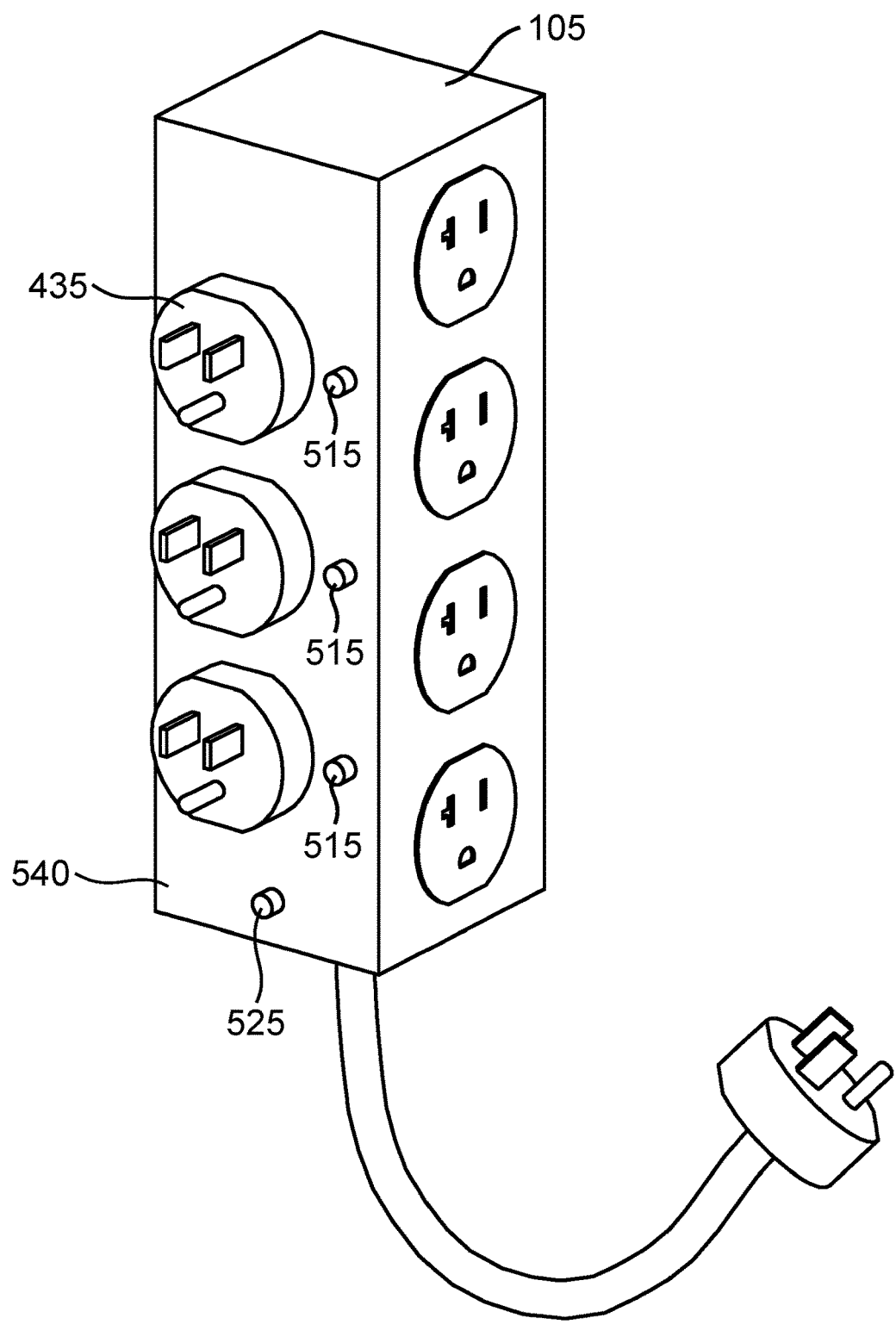
FIG. 5A is an isometric view of an embodiment of the transfer switch assembly allowing for local user input by use of buttons next to each plug connector, according to one example embodiment.

FIG. 5A is an isometric view of one embodiment of the transfer switch assembly 540 allowing for local user input. Buttons 515 are placed directly on the portable switch body 105 and adjacent to the plug connectors 435 that they each represent. By pressing any of the buttons 515, a user may select a desired power source from which to draw power. A reset button 525 is also included in an embodiment to undo any previous power source selections made by the user.

Figure 5B:
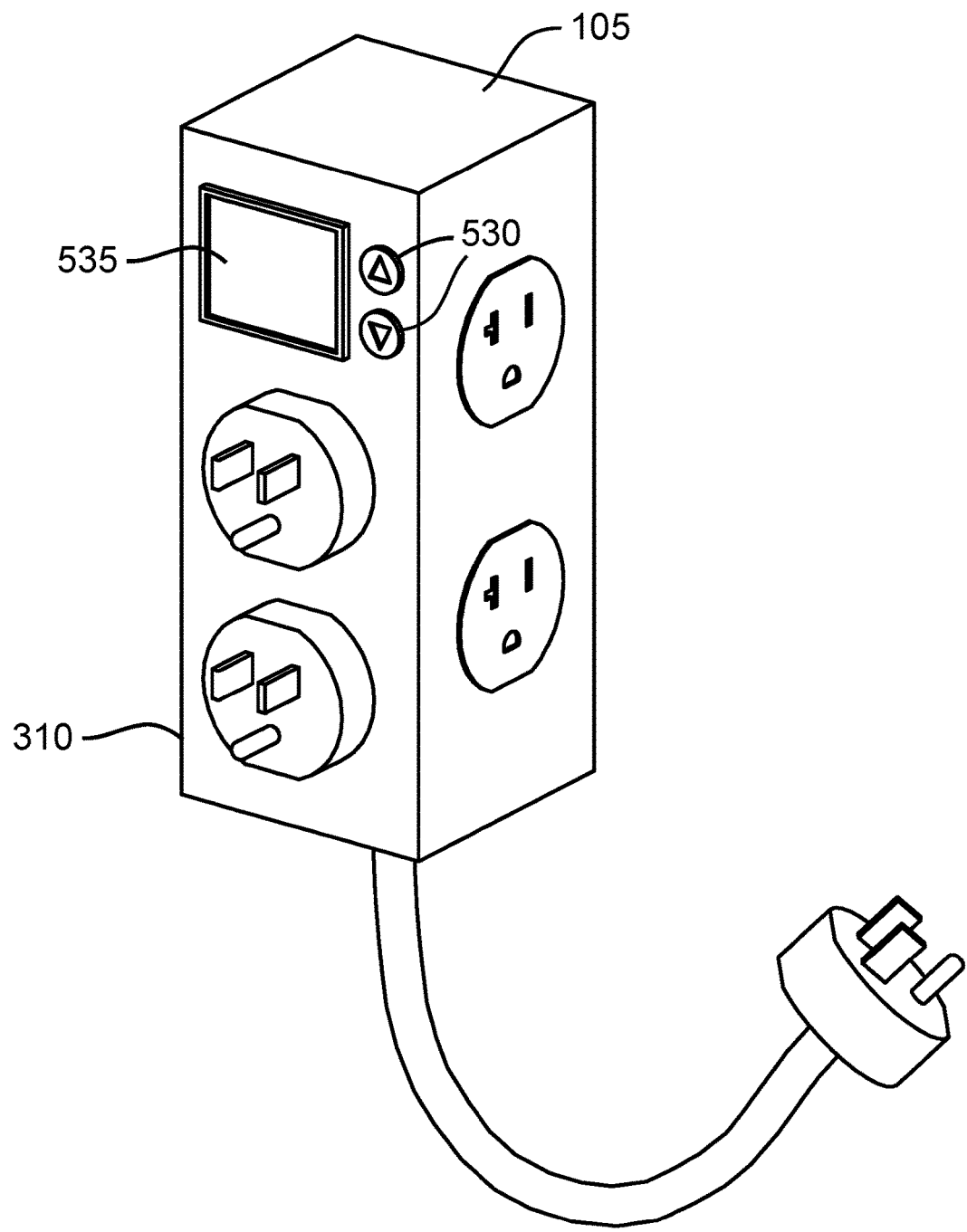
FIG. 5B is an isometric view of an embodiment of the transfer switch assembly allowing for local user input by use of a control screen on the portable switch body, according to one example embodiment.

FIG. 5B is an isometric view of one embodiment of the transfer switch assembly 310 allowing for local user input. A control screen 535 is housed directly on the portable switch body 105. The control screen 535 may be touch screen, or screen buttons 530 may be included to allow a user to navigate the control screen 535 and make selections.

Figure 6:
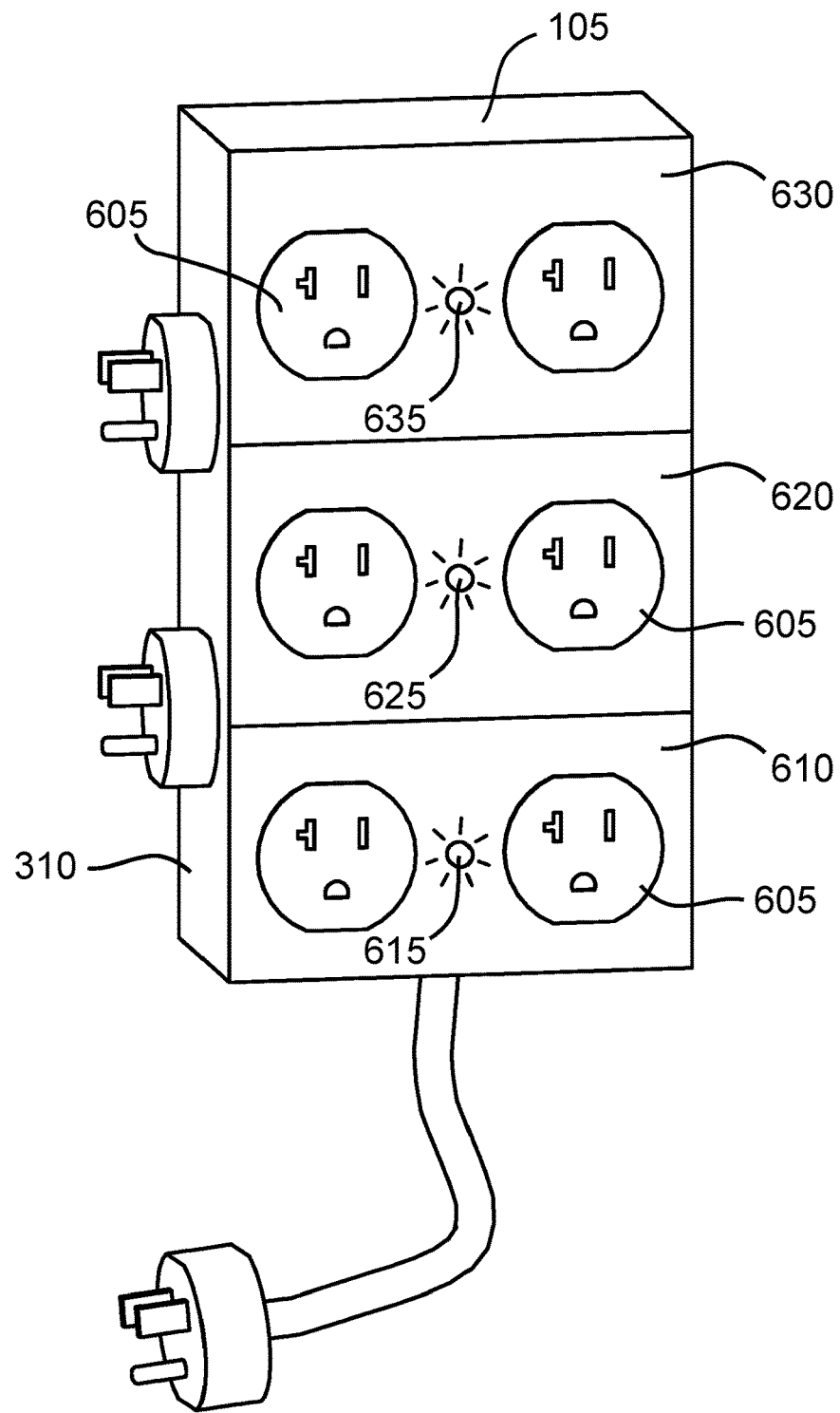
FIG. 6 is an isometric view of an embodiment of the transfer switch assembly allowing for functionality of load shedding, according to one example embodiment.

FIG. 6 is an isometric view of an embodiment of the transfer switch assembly 310 allowing for functionality of load shedding. The receptacle connectors 605 are spatially arranged into groups on the portable switch body 105. The first group 610 includes receptacle connectors 605 to what are considered the critical loads. The first group 610 has an associated LED indicator 615 that will illuminate a unique color when power is available to the critical loads. The second group 620 includes the receptacle connectors 605 to what are considered the emergency loads. The second group has an associated LED indicator 625 that will illuminate a unique color when power is available to emergency loads. The third group 630 includes the receptacle connectors 605 to what are considered the normal loads. The third group has an associated LED indicator 635 that will illuminate a unique color when power is available to normal loads. The first group 610 is given preference over the second group 620 which is given preference over the third group 630. The receptacle connectors 605 of the less preferred groups will be electrically disconnected from the power sources as determined by the logic and as a power supply becomes insufficient to meet all load demands.

In certain embodiments, the normal loads may be identified by a green light, emergency loads by a yellow light, and critical loads by a red light. The load shedding feature may be implemented when no other sources are available and the solar/battery module is at a reduces energy state. Sensors may inform the user defined switch controller to turn off the normal loads in order to conserve the energy that is available in the batteries. In critical situations, the load shedding may include both normal and emergency loads, leaving only the critical loads with power.

In another embodiment, the switch controller may switch power over from the solar to the generator and also shed normal loads, knowing that there is a minimal amount of fuel available to the generator. The controller receives input from a fuel level sensor that informs this decision. By having the ability to switch all connected power sources and loads via the load shedding feature, the controller may configure the switches in a manner that best serves every user selected scenario.

Figure 7A:
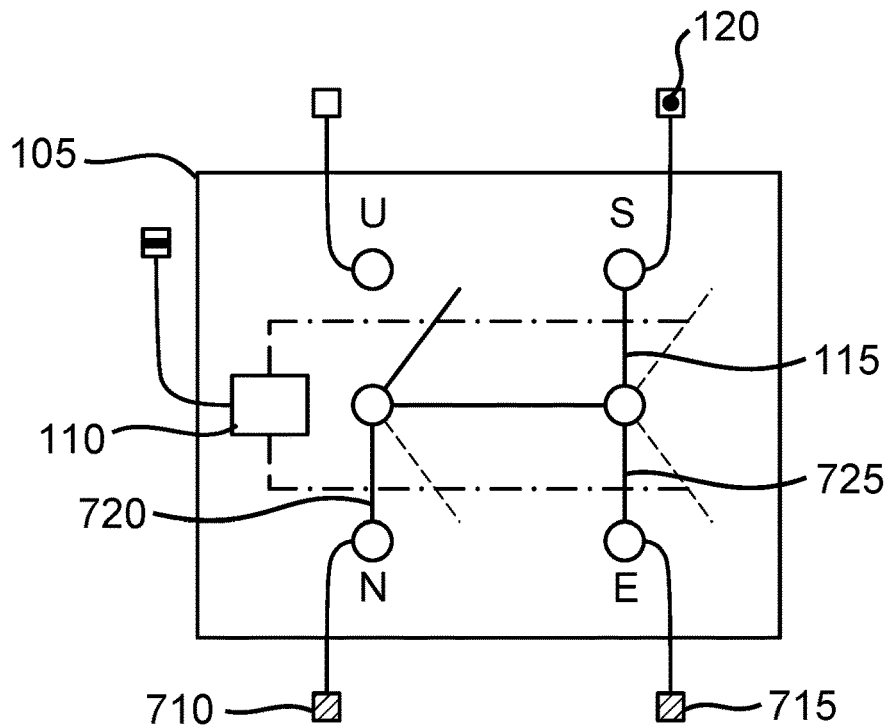
FIGS. 7A and 7B show the user defined switch controller with possible configurations of the switches to demonstrate load shedding, according to certain example embodiments.
Figure 7B:
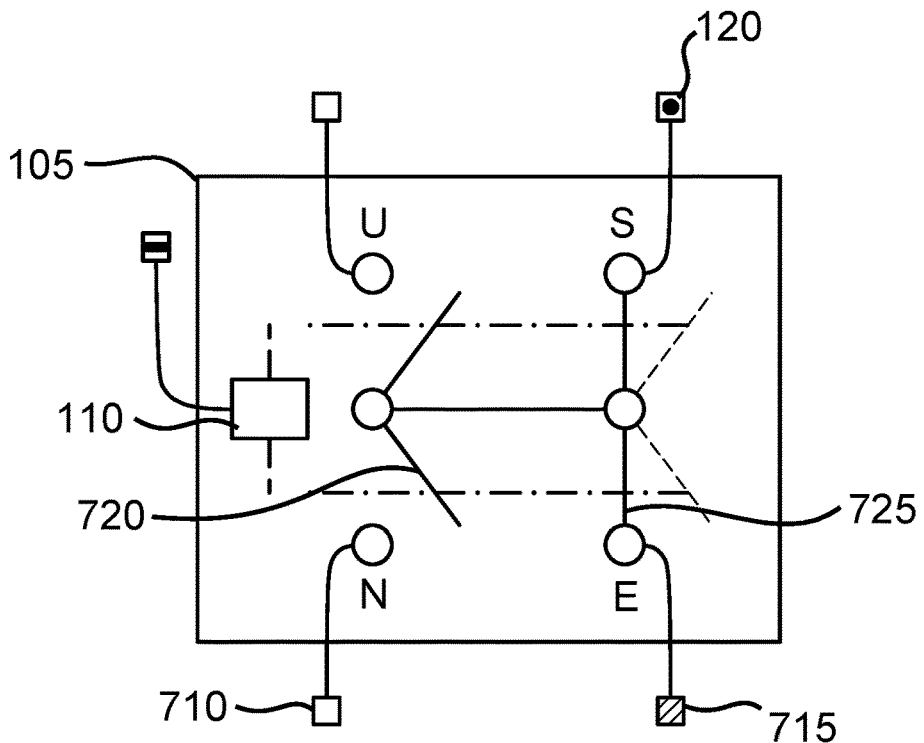

FIGS. 7A and 7B are views of the user defined switch controller 110 inside a portable switch body 105, with possible configurations of the switches in order to demonstrate an instance of load shedding. FIG. 7A shows that the user defined switch controller 110 has selectively connected a switch 115 to a power source 120, for example solar, to supply power to the second loads including a normal load 710 and an emergency load 715. The normal load 710 has been selectively connected with a switch 720 by the user defined switch controller 110. The emergency load has been selectively connected with a switch 725 by the user defined switch controller 110. FIG. 7B shows load shedding as a result of the determination by the logic that there is not enough power to supply to both of the second loads. The user defined switch controller 110 selectively disconnects the switch 720 from the normal load 710 and power is only supplied to the emergency load 715.

Figure 8A:
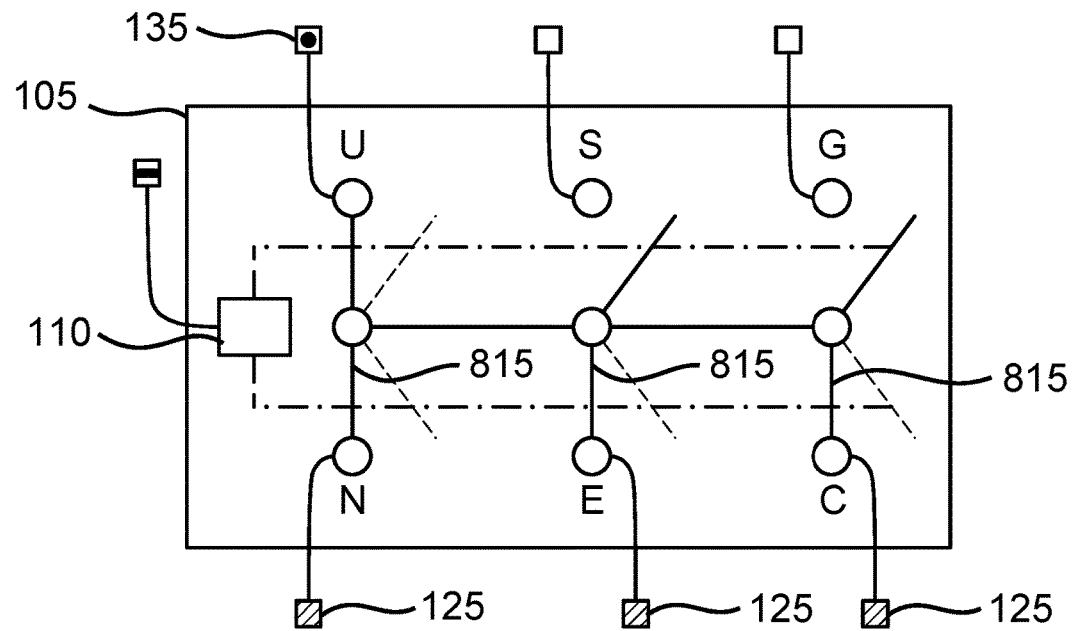
FIGS. 8A and 8B show the user defined switch controller with possible configurations of the switches to demonstrate an instance of changing which power source is supplying power followed by load shedding, according to certain embodiments.
Figure 8B:
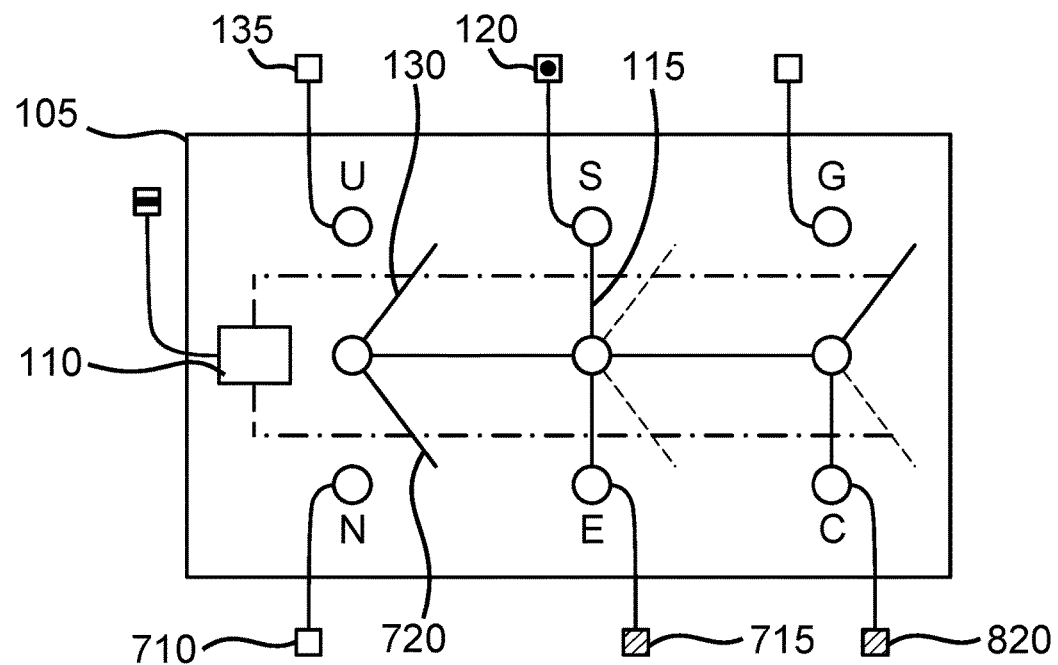

FIGS. 8A and 8B are views of the user defined switch controller 110 inside a portable switch body 105, with possible configurations of the switches to demonstrate selectively connecting a new power source followed by load shedding. FIG. 8A shows that a power source 135, for example the utility grid, is capable of supplying power to three instances of second loads 125 that have been selectively connected to switches 815 by the user defined switch controller 110. FIG. 8B shows that the logic has determined that a different power source 120, for example solar, must supply power. The user defined switch controller 110 selectively disconnects the switch 130 from the power source 135 shown in FIG. 8A and selectively connects a switch 115 to a different power source 120. Upon connection of the different power source 120, the user defined switch controller 110 determines that there is not enough power to supply all three of the second loads 125. The user defined switch controller 110 selectively disconnects the switch 720 from the normal load 710 and power is supplied to only the emergency load 715 and critical load 820.

Figure 9:
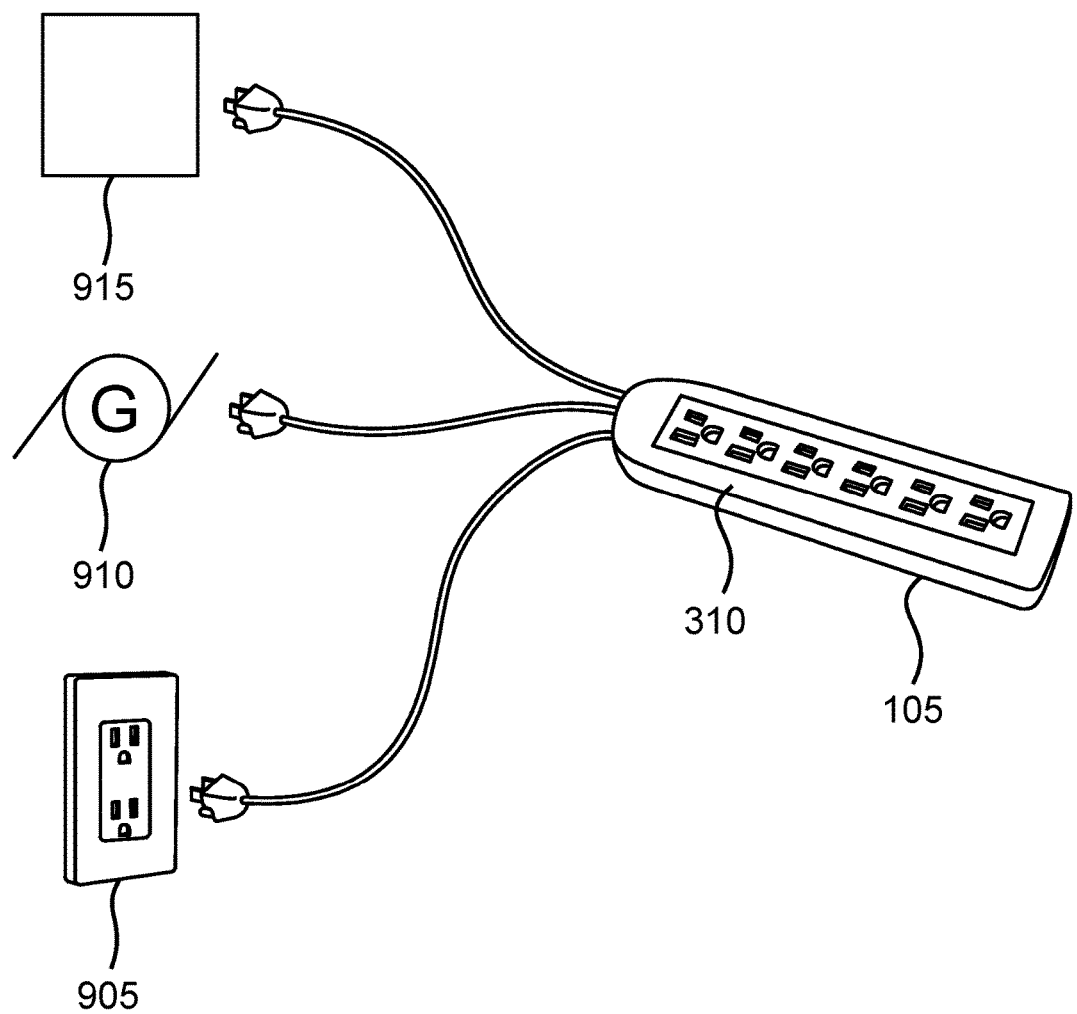
FIG. 9 shows various power sources that are connectable to the transfer switch assembly, according to one example embodiment.

FIG. 9 shows an embodiment of the portable switch body 105 wherein various power sources are able to connect to the transfer switch assembly 310. The transfer switch assembly 310 allows for connections to the utility grid line 905, a generator 910, or other power sources 915 including fuel cells, batteries, wind, solar or hydroelectric.

Figure 10:
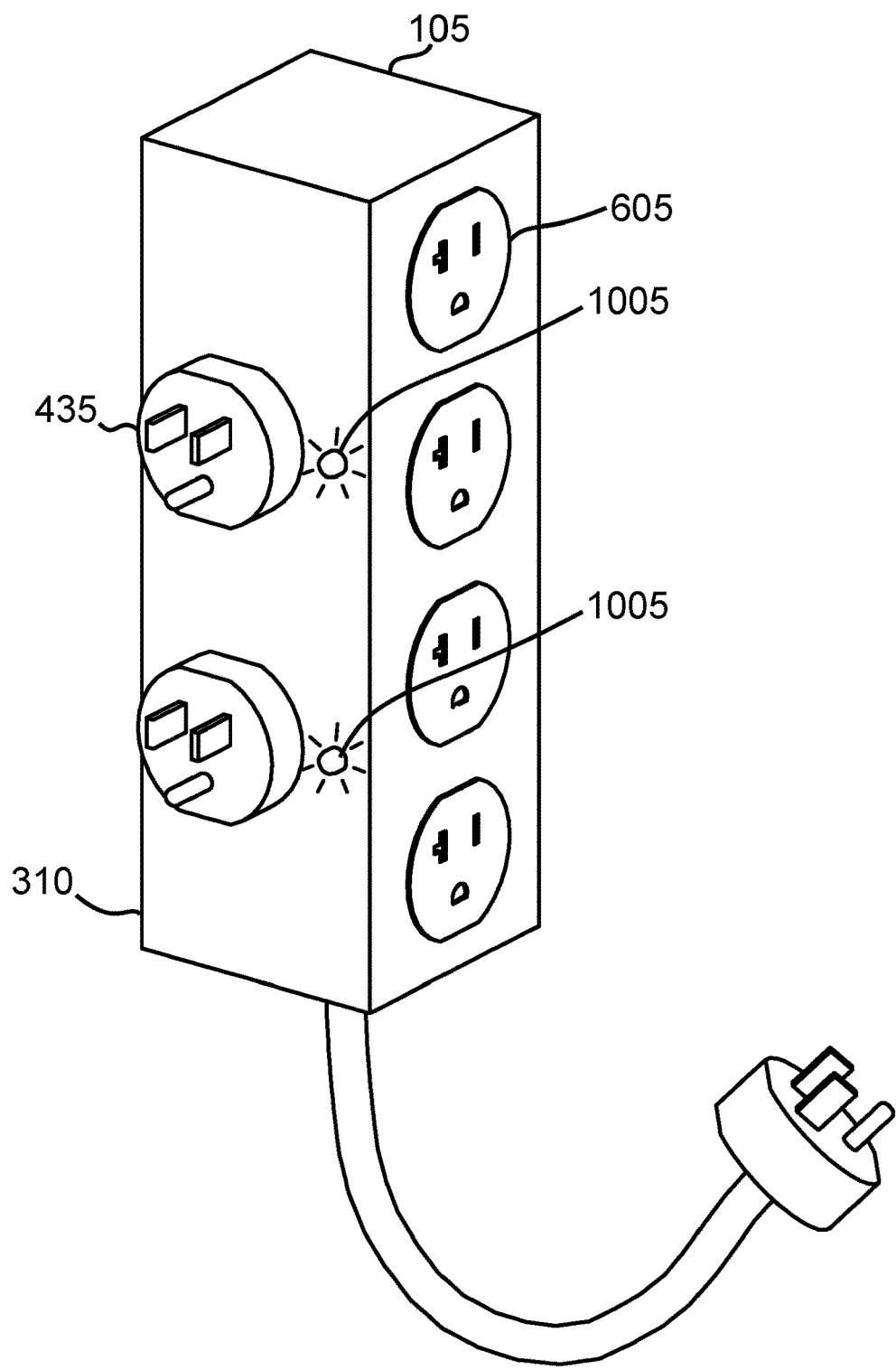
FIG. 10 is an isometric view of an embodiment of the transfer switch assembly with LED indicators to indicate which power sources are supplying power to the loads, according to one example embodiment.

FIG. 10 is an isometric view of an embodiment of the transfer switch assembly 310. LED indicators 1005 are placed on the portable switch body 105 and adjacent to the plug connectors 435 that they represent. The LED indicator 1005 will illuminate when the power source connected to the plug connector 435 has been selected by the logic and the user defined switch controller has electrically connected that power source to the receptacle connectors 605.

Figure 11B:
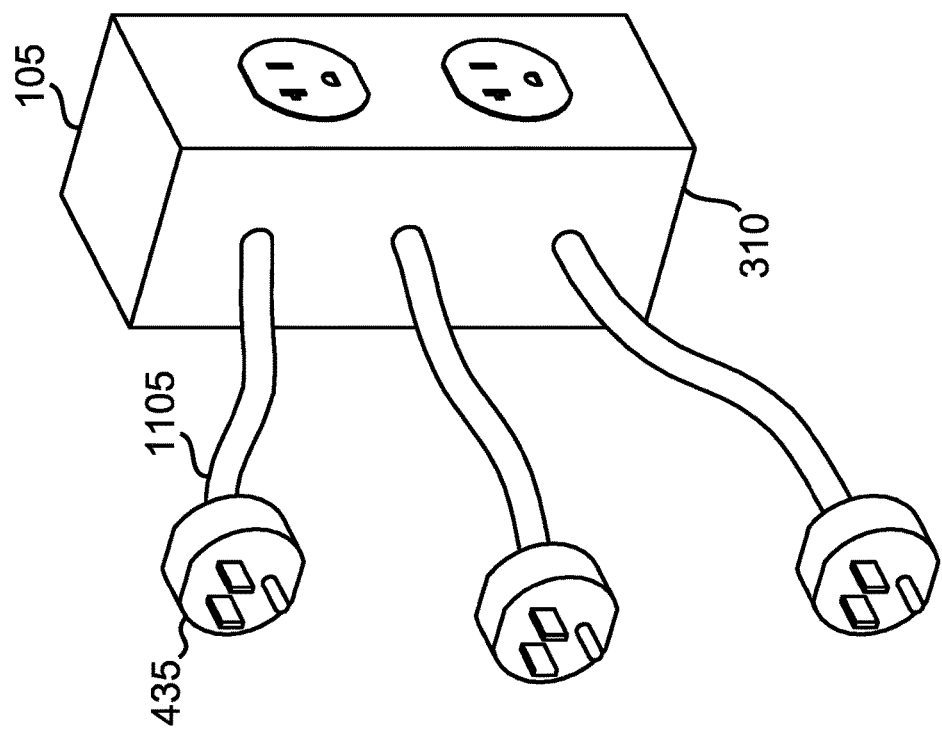
FIGS. 11A and 11B show isometric views of the transfer switch assembly with plug connectors that are attached to the portable switch body either directly or via an electrical cord, according to certain example embodiments.
Figure 11A:
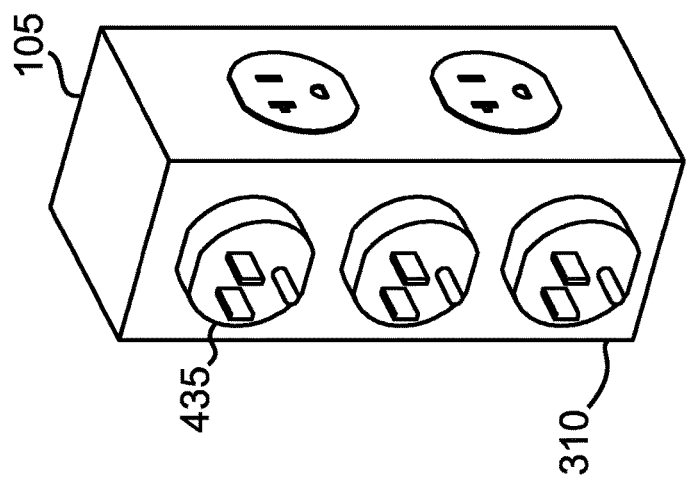

FIGS. 11A and 11B show isometric views of embodiments of the transfer switch assembly 310. FIG. 11A shows plug connectors 435 that are attached directly to the portable switch body 105. FIG. 11B shows plug connectors 435 that are attached to the portable switch body 105 via an electrical cord 1105.

FIGS. 12A and 12B show isometric views of embodiments of the transfer switch assembly 310. FIG. 12A shows receptacle connectors 605 that are attached directly to the portable switch body 105. FIG. 12B shows receptacle connectors 605 that are attached to the portable switch body 105 via an electrical cord 1105.

Figure 13A:
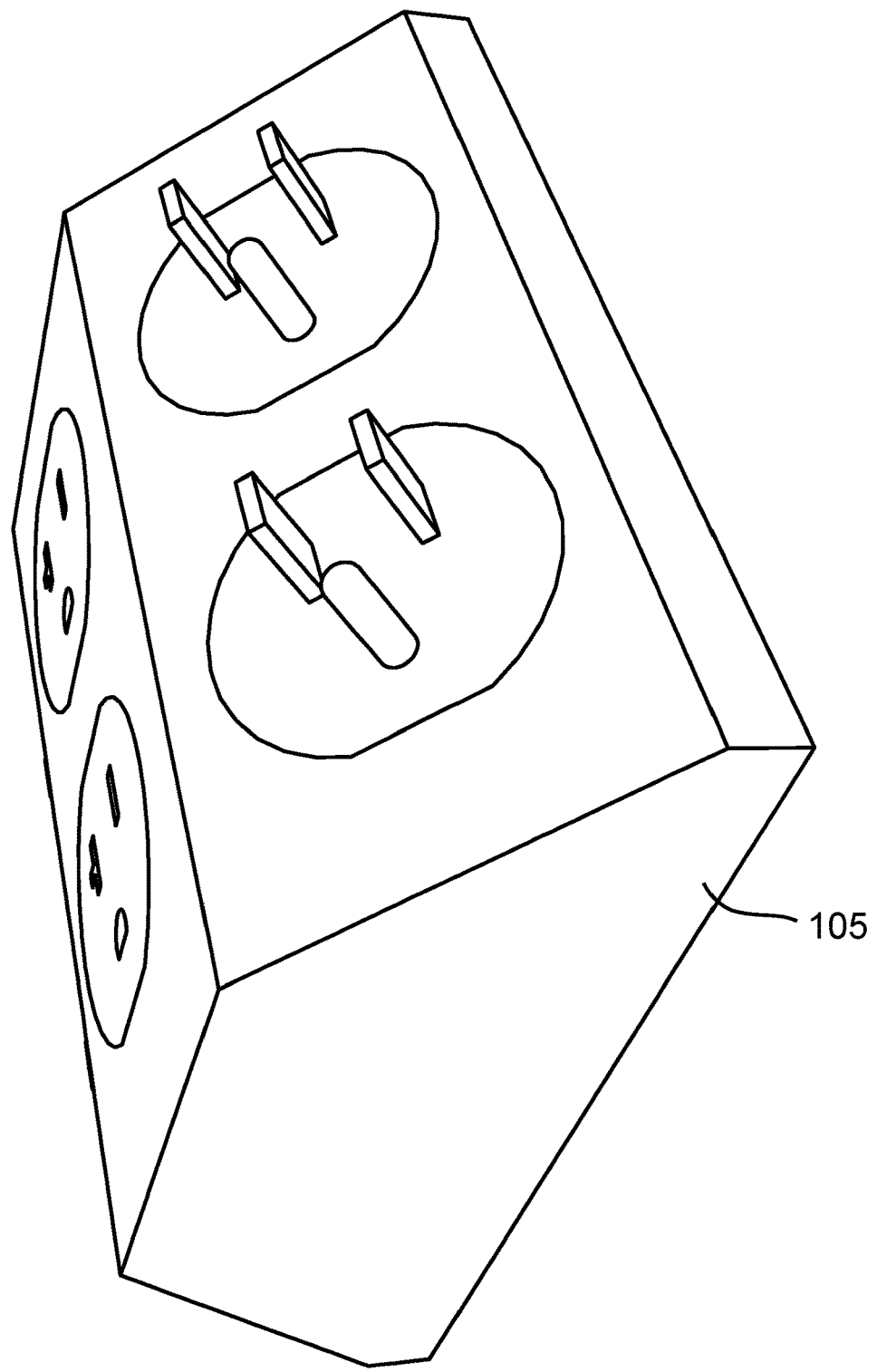
FIG. 13A shows a possible embodiment of the transfer switch assembly demonstrating that the portable switch body may take on varying shapes, according to one example embodiment.

FIG. 13A shows an isometric view of an embodiment of the transfer switch assembly 310. The portable switch body may take on varying shapes as shown in this drawing.

FIG. 13B is an isometric view of an embodiment of the transfer switch assembly 310 wherein the entire portable switch body 105 can be plugged and unplugged directly with a standard wall outlet 1305 by means of the plug connectors 435.

Figure 14:
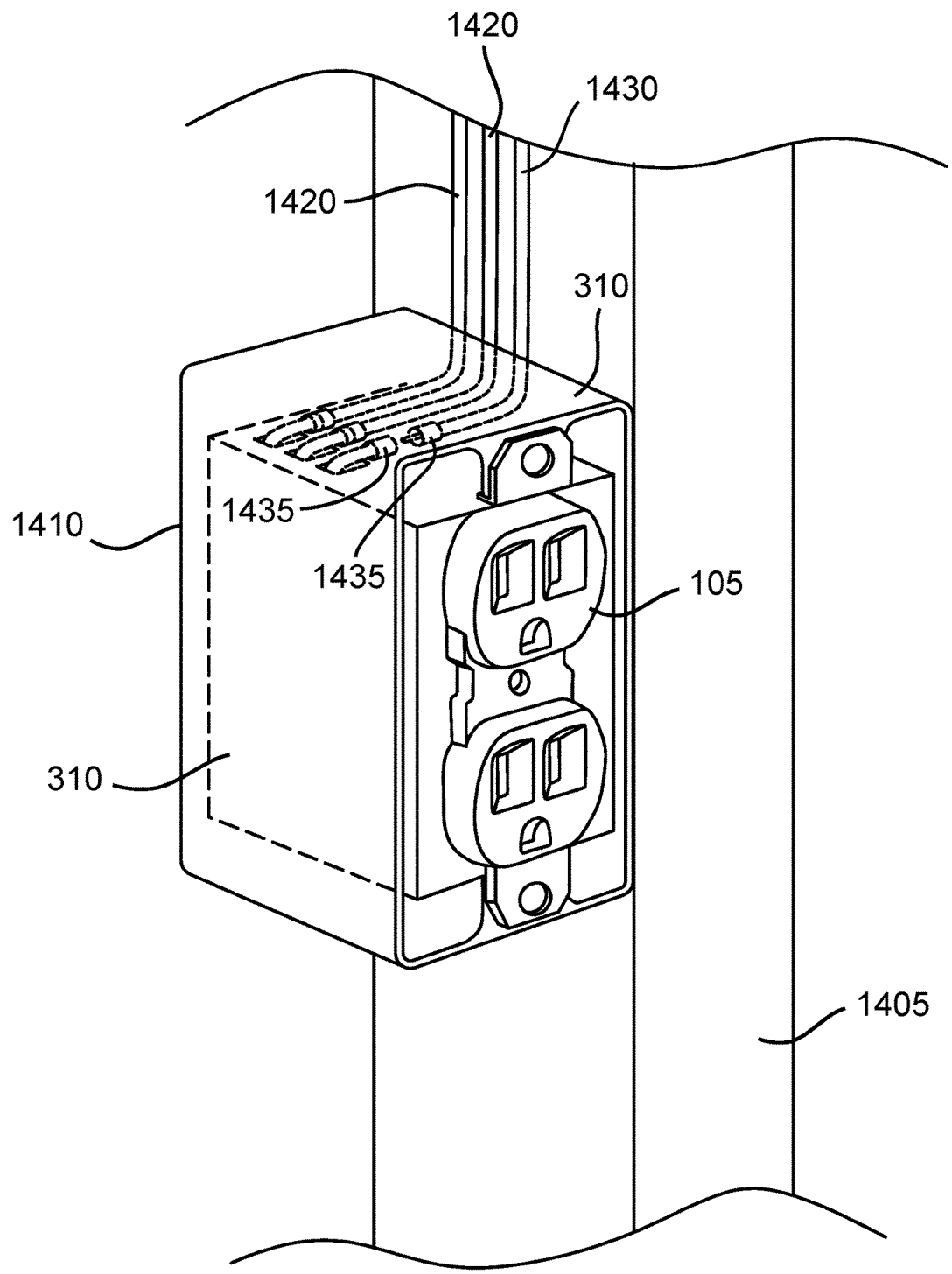
FIG. 14 is an isometric view of an embodiment of the transfer switch assembly wherein the portable switch body is attached to a wall stud and housed inside of a wall, according to one example embodiment.

FIG. 14 is an isometric view of an embodiment of the transfer switch assembly 310. The portable switch body 105 is placed inside a standard electrical box which is mounted to a wall stud 1405 and housed within the wall. The portable switch body 105 is interfaceable with a standard wall outlet cover plate such that only the receptacle connectors (e.g., receptacle connectors 605, as illustrated in FIG. 6, for example) are visible from the exterior of the wall. The embodiment maintains plug connectors 1435 to electrically connect with the power sources. This version of the portable switch assembly enables the user to temporarily mount the device in an aesthetically pleasing manner and still allow the transfer switch to be removed and moved if required. For example, if the device fails it can be replaced by simply unplugging the connectors and removing it from the electrical box. This configuration also allows for upgrades to the device in the future. As more advanced feature rich devices become available in the future, the device can be easily removed and replaced with the upgrade. In another embodiment, the switch assembly may be designed to allow the entire switch assembly to be removed from the box by pushing tabs that release the assembly from the box. In certain embodiments, these tabs may be located on the edges of the cover plate allowing the user to remove the switch assembly without removing the cover plate. In this embodiment, the cover plate is attached to the switch assembly and is released together with the assembly when removing it from the box.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An electrical transfer switch assembly, comprising:
 a portable switch body comprising:
 at least two or more switches;
 two or more plug connectors electrically connected to one or more of the two or more switches and connected to one or more power sources or one or more first loads;
 one or more receptacle connectors electrically connected to one or more of the two or more switches and connected to one or more second loads; and
 a user defined switch controller that selectively connects the plugs and receptacles with the one or more power sources and with the one or more first and second loads, wherein the user defined switch controller communicates operational commands to the one or more power sources, and wherein the operational commands comprise at least one of: turning the one or more power sources on or off; turning heating or cooling systems of the one or more power sources on or off; changing settings; and turning specific system or device features on or off.

2. The assembly of claim 1, wherein the selective connections are determined by logic, wherein the logic is defined by the user and maintains settings until redefined, and wherein the logic is informed by operation variables, sensor data and user input.

3. The assembly of claim 2, wherein the operation variables comprise, cost of power, time, history of power consumption, rate of power consumption, load requirements, weather conditions, charts and data stored in memory, user defined variables, user defined operations, real-time variable inputs from remote stations, and user selected connections of the user defined switch controller.

4. The assembly of claim 2, wherein the user input to inform the logic comprises executable instructions;
 wherein the executable instructions comprise one or more of: control of selective connections; control of operations of the one or more power sources; control of load shedding; and user defined executable instructions.

5. The assembly of claim 4, wherein the user input is communicated to the user defined switch controller from remote locations or local locations;
 wherein the remote locations comprise one or more of a computer; a phone; a network; a cloud network; a master station; a remote server; a wireless device; and
 wherein the local locations comprise one or more of a button; a switch; a display; a user interface on the portable switch body, and a touch screen display.

6. The assembly of claim 5, wherein the user input is communicated to the user defined switch controller from the remote locations by communication means comprising one or more of wired pathways; PLC; Ethernet cable; wireless pathways; WiFi; satellite; cellular technology; Bluetooth; high bandwidth wireless; low bandwidth wireless;
 wherein the user defined switch controller communicates information to the remote devices by the communication means; and
 wherein the information comprises the user input; the sensor data; and the operation variables.

7. The assembly of claim 1, wherein the user defined switch controller further comprises:
 a power supply;
 a computer readable storage medium;
 one or more processors; and
 antennas, radios, and devices for communicating a signal to and from monitoring and control modules.

8. The assembly of claim 2, wherein the sensor data comprises AC and DC voltage levels and fluctuations; AC and DC current levels and fluctuations; frequency variations; interruptions in power; fuel level; battery voltage; temperature; analog sensor data; digital sensor data; and user configured sensor data.

9. The assembly of claim 8, wherein the sensor data is communicated to the user defined switch controller from the one or more power sources by communication means comprising PLC; Ethernet cable; WiFi; satellite; cellular technology; Bluetooth, high bandwidth or low bandwidth wireless.

10. The assembly of claim 1, wherein the operational commands comprise turning a battery charger on or off.

11. The assembly of claim 2, wherein the logic stores historical states of the operation variables and sensor data, and wherein the logic predicts future states of the operation variables and sensor data.

12. The assembly of claim 2, wherein:
the logic is stored in at least one or more locations comprising memory in the user defined switch controller, memory in a mobile device, memory at a master station, and memory external to the user defined switch controller; and
wherein the user determines which location has priority control of the assembly.

13. The assembly of claim 2, wherein the logic prioritizes the one or more receptacle connectors for load shedding by selectively switching power to feed only receptacles determined by the logic to be priority during a specific time period.

14. The assembly of claim 11, wherein the one or more receptacle connectors are arranged spatially into groups designed for load shedding, and
wherein the selective connection of the receptacle connectors of each group of the one or more power sources is represented by the illumination of a load indicator; and
wherein the load indicator comprises one or more visual and audible devices.

15. The assembly of claim 1, wherein the one or more power sources comprise utility, generators, renewable energy sources, wind, solar, hydroelectric, fuel cells, energy producing devices, energy producing systems, energy storage systems, and batteries.

16. The assembly of claim 1, wherein the one or more power sources comprise one or more of AC and DC power supplies.

17. The assembly of claim 1, wherein the two or more plug connectors and the one or more receptacle connectors terminate in standard male or female connections that are configured according one or more of NEMA, ANSI, IEEE, IPC, USB, ISO and IEC electrical standards.

18. The assembly of claim 1, comprising power indicators that indicate which of the two or more plug connectors is selectively connected with the one or more power sources; and
wherein the power indicators comprise one or more of audible and visual devices.

19. The assembly of claim 1, wherein the two or more plug connectors and the one or more receptacle connectors are attached to the portable switch body directly or via an electrical cord.

20. The assembly of claim 1, wherein the portable switch body mounts inside a standard electrical utility box, and wherein the portable switch body is interfaceable with a standard device cover plate.

* * * * *